June 16, 1931.  G. H. BEAUMONT  1,809,959
SPRING
Filed June 26, 1928
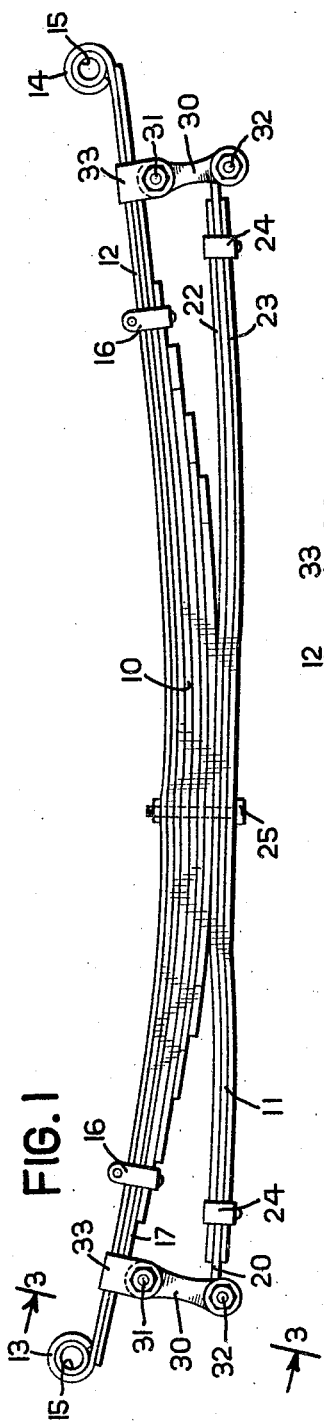
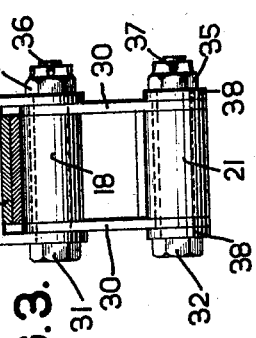
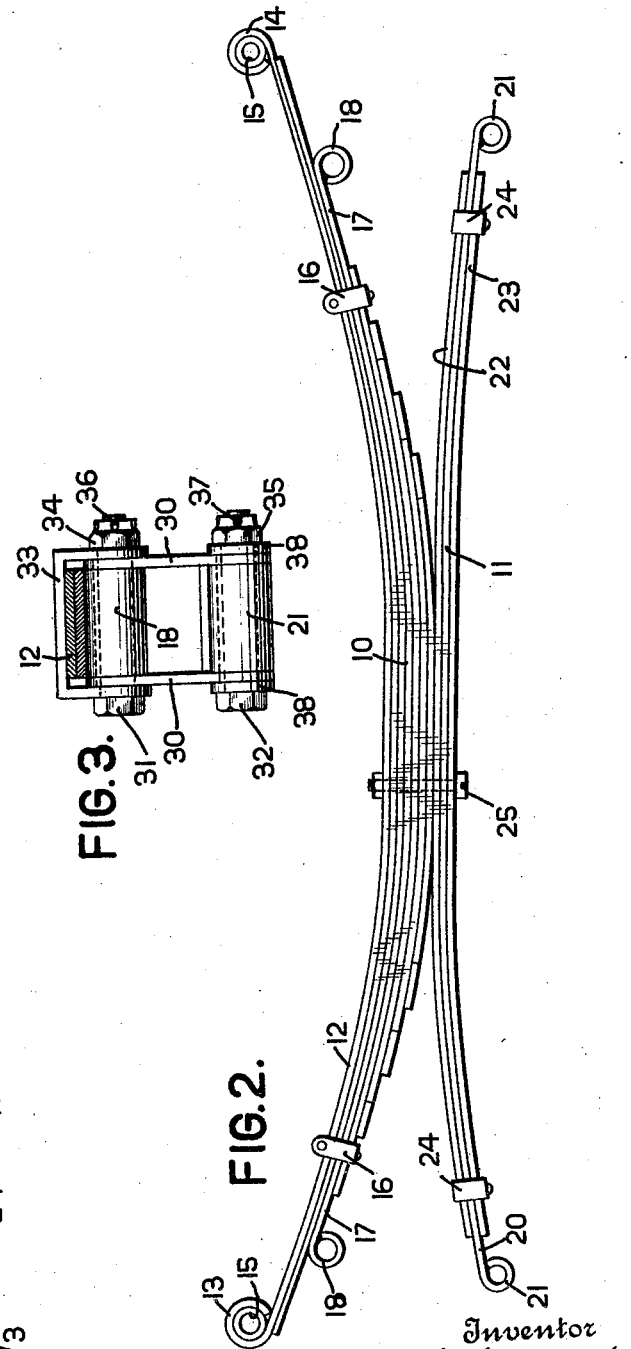
Inventor
George H. Beaumont
By his Attorney
Albert N. Austen Patented June 16, 1931

1,809,959

UNITED STATES PATENT OFFICE

GEORGE H. BEAUMONT, OF CLEVELAND, OHIO, ASSIGNOR TO STERLING SPRING COMPANY, OF CLEVELAND, OHIO, A CORPORATION OF DELAWARE

SPRING

Application filed June 26, 1928. Serial No. 288,313.

This invention relates to springs, and more particularly to vehicle springs of a compound character and a new and improved link mechanism for interconnecting the various parts thereof.

For certain uses it is desirable to employ a spring formed in two sections which are normally joined in mutually opposing relationship. A leaf spring for motor vehicles constructed in this manner may comprise a series of load carrying leaves and one or more auxiliary spring leaves operatively associated therewith and arranged to exert a downward force on the load carrying leaves when the spring is in neutral position.

This invention provides a new and improved link mechanism for connecting the auxiliary leaves to the main load carrying leaves whereby the various leaves of the spring are prevented from separating and the stresses are distributed in an advantageous manner.

In accordance with the present invention certain leaves of the main spring and of the auxiliary spring are extended to form knuckles through which shackle bolts may be inserted for pivotally securing the connecting links thereto. A strap is provided passing over the upper leaf of the load carrying spring and cooperating with the link mechanism to transfer a portion of the downward pull of the auxiliary spring to the upper leaf of the main spring. In this manner the stresses are applied uniformly to the entire spring assembly instead of being carried by a single leaf only. Furthermore, the various leaves are held in substantial engagement whereby undesirable vibrations and noises are prevented.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which.

Fig. 1 is a side elevation of a spring constructed in accordance with the present invention;

Fig. 2 is a side elevation of the spring with the connecting links removed; and

Fig. 3 is a section taken on the line 3—3 of Fig. 1.

Like reference characters denote like parts in the several figures of the drawings.

In the following description and in the claims parts will be identified by specific names for convenience, but they are intended to be as generic in their application to similar parts as the art will permit.

Referring to the drawings more in detail, the invention is shown as applied to a spring assembly comprising a main load carrying spring 10 and an auxiliary spring member 11 associated therewith. The load carrying spring 10 comprises an upper leaf 12 which may be extended at its two ends to form knuckles 13 and 14 to facilitate attachment of a vehicle chassis. Bushings 15 may be inserted in knuckles 13 and 14 for strengthening purposes, if desired. Disposed adjacent leaf 12 are a plurality of additional leaves of progressively decreasing length which are assembled in a manner well known in spring construction, and are so designed that the proper stress distribution within the spring is obtained.

Clips 16 may be employed for securing certain of the leaves together and preventing the upper leaves from being drawn out of contact with the lower leaves when the spring is flexed. An intermediate lower leaf 17 may be extended at its ends to form knuckles 18 for a purpose to be set forth.

Auxiliary spring member 11 comprises a central leaf 20 extended at its two ends to form knuckles 21 and adjacent upper and lower leaves, 22 and 23 respectively. The ends of the various leaves may be secured together as by clips 24 to prevent separation thereof. The centers of auxiliary spring 11 and load carrying spring 10 may be secured together by means of bolt 25 passing through the various leaves thereof and may be secured to a vehicle chassis (not shown) in any well known manner.

Auxiliary spring 11 may be operatively secured to load carrying spring 10 by links 30 cooperating with shackle bolts 31 and 32 which are passed through knuckles 18 and 21 respectively. Strap 33 is passed over the upper spring leaf 12 and extended downwardly at its two ends and provided with suitable openings to receive shackle bolt 31. Bolts 31 and 32 may be secured by lock nuts 34 and 35 which are suitably drilled as at 36 and 37 to receive retaining pins (not shown). Washers 38 may be interposed between bolt 32 and links 30 if desired.

The mechanical arrangement of the link mechanism should be such that free pivotal movement of links 30 about shackle bolts 31 and 32 may be obtained. These bolts may be further provided with suitable oiling means in accordance with the usual practice.

Strap 33 is designed to contact with the upper surface of leaf 12 and to hold leaf 17 and the intervening leaves in engagement therewith. Said strap is, however, not intended to exert a sufficient pressure on said leaves to materially increase the friction therebetween.

Auxiliary spring 11 is so constructed that it will normally exert a downward pressure upon the load carrying spring 10. A portion of this force will be applied directly to knuckles 18 and the remainder thereof will be transferred by strap 33 to upper leaf 12 and thence to the entire spring assembly. When the main spring is compressed a sufficient amount to permit the auxiliary spring 11 to pass its free point the latter spring will thereafter aid the main spring in supporting the applied load. It is evident, that the auxiliary spring serves to cushion light shocks and to enable the load supporting spring to more readily respond to minor variations, but when depressed pass its free point will assist the load carrying spring in supporting the applied weight.

The link construction described herein permits the various spring members to perform their above described functions and causes the stresses to be distributed in a particularly advantageous manner. The connecting links are pivotally attached to an intermediate leaf of the main spring, whereas the force of compression is applied by the strap to the entire group of leaves comprising the load carrying spring.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

What is claimed is:

1. In a vehicle chassis spring, a main load carrying spring, an auxiliary spring associated therewith, knuckles formed on selected leaves on each of said springs, link mechanism pivotally interconnecting said knuckles and normally securing said springs in mutually opposed relationship and means associated with said link mechanism for transferring stresses to the entire load carrying spring.

2. A spring assembly comprising a load carrying leaf spring formed of a plurality of spring leaves of progressively decreasing lengths, an auxiliary leaf spring comprising a plurality of leaves mounted adjacent the shorter leaf, intermediate leaves of said load carrying spring and of said auxiliary spring being extended and provided at their ends with knuckles adapted to receive shackle bolts, link mechanism interconnecting said knuckles, and a strap associated with said link mechanism and passing over the outer leaf of said load carrying spring, said strap being adapted to prevent relative vertical movement of said leaves and to distribute applied stresses to said upper leaf.

3. A spring assembly comprising a load carrying leaf spring formed of a plurality of spring leaves of progressively decreasing lengths, an auxiliary leaf spring associated therewith adjacent the shorter leaf, an intermediate leaf of said load carrying spring being extended and provided at its ends with knuckles adapted to receive shackle bolts, link mechanism interconnecting said knuckles and said auxiliary spring, and means associated with said link mechanism for distributing stress to the entire load carrying spring.

4. A spring assembly comprising a load carrying leaf spring formed of a plurality of spring leaves of progressively decreasing lengths, an auxiliary leaf spring associated therewith adjacent the shorter leaf, an intermediate leaf of said load carrying spring being extended to form knuckles adapted to receive shackle bolts, link mechanism interconnecting said knuckles and said auxiliary spring, and a strap associated with said link mechanism and passing around said load carrying spring, said strap being adapted to prevent relative vertical movement of said leaves and to distribute stress to said load carrying spring.

5. In a vehicle chassis spring, an upper spring leaf extended at its ends to form knuckles to facilitate attachment to a chassis, a plurality of adjacent leaves of progressively decreasing length operatively associated therewith, one of said adjacent leaves being extended to form a knuckle, said last mentioned knuckle being positioned below said chassis spring and intermediate the ends thereof, an auxiliary spring comprising a plurality of leaves mounted below said first mentioned spring, an intermediate leaf of said auxiliary spring being extended at its ends to form knuckles, link mechanism interconnecting said last mentioned knuckles with the intermediate knuckles of said main spring, said link mechanism comprising a pair of side links, shackle bolts passing through said side links and said knuckles, and a strap member pivotally mounted on one of said shackle bolts and extending over said first mentioned upper spring leaf, said strap being adapted to hold said leaves in substantial engagement but being sufficiently loose to prevent a material increase in friction therebetween.

In testimony whereof I have hereunto set my hand.

GEORGE H. BEAUMONT.